US006320872B1

(12) United States Patent
Asbjorn et al.

(10) Patent No.: US 6,320,872 B1
(45) **Date of Patent: *Nov. 20, 2001**

(54) SERIALLY BUFFERED MEDIUM TRANSLATOR

(75) Inventors: Sorhaug Asbjorn, Gronton, MA (US); Aleksandr L. Kupchik, Nashua, NH (US)

(73) Assignee: Metrobility Optical Systems, Inc., Merrimack, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/799,246

(22) Filed: Feb. 14, 1997

(51) Int. Cl.[7] .................................. H04J 3/22; H04J 3/06

(52) U.S. Cl. ........................... 370/466; 370/503; 713/189

(58) Field of Search .................................... 370/466, 465, 370/467, 469, 501, 503, 401, 402, 404, 406, 419, 420; 359/118, 119, 125, 136, 137; 375/211, 214, 354, 359–361; 341/100, 101; 380/9, 255; 713/193, 189, 200, 201

(56) References Cited

U.S. PATENT DOCUMENTS

| | | | | |
|---|---|---|---|---|
| 4,661,950 | * | 4/1987 | Kobayashi et al. | 370/445 |
| 5,406,554 | | 4/1995 | Parry . | |
| 5,436,902 | * | 7/1995 | McNamara et al. | 370/447 |
| 5,459,723 | | 10/1995 | Thor . | |
| 5,465,254 | * | 11/1995 | Wilson et al. | 370/466 |
| 6,058,479 | * | 5/2000 | Sorhaug et al. | 713/193 |

OTHER PUBLICATIONS

ICS Data Book 1996, pp. F–47 to F–48 part No. ICS1886 Data Sheet.

ICS Internet Web Page, Feb. 1997, Part No. ICS1885/1886 Applications Note.

Nat. Semi. 1994 Data Book, pp. 1–3 to 1–12, Part. No. DP83222 Data Sheet.

Nat. Semi. 1994 Data Book, pp. 1–13 to 1–21, Part No. DP83223 Data Sheet.

* cited by examiner

*Primary Examiner*—Chau Nguyen
*Assistant Examiner*—Soon-Dong Hyun
(74) *Attorney, Agent, or Firm*—Stephen G. Matzuk

(57) ABSTRACT

A bidirectional network medium translator connected between two dissimilar network media, e.g. Fiber Optic (FX) and Twisted Pair (TX), comprising a transceiver and a clock recovery element for each medium, and a bidirectional serial buffer which receives, processes and transmits the data while in the serial data format. Thus, the apparatus according to the present invention is operable to the maximum data rates currently used, provides significantly reduced data delay, and may be field-modified to a variety of different media.

9 Claims, 3 Drawing Sheets

SERIALLY BUFFERED MEDIUM TRANSLATOR

FIELD OF THE INVENTION

The present invention relates to data medium translators, in particular, local and wide area network data medium translators.

BACKGROUND OF THE INVENTION

Previously, the most widely used approach for transmitting a first format data on a second format was to use the same approach as in the network hub. However, translation via the data hub port introduces significant data delays, typically in excess of 90 serial data bits, which reduces the network performance and adds to the limitations of the physical size of the network.

Such data delay and other data translation limitations experienced by hub and other prior data translation devices are, in large part, a result of internal transfer data from the incoming media serial format to an internal parallel format for buffering or processing, and back to the serial format for retransmission. The well established building blocks used in many such systems consist of an integrated circuit, e.g. part # DP83223, which provides the necessary electrical signalling and media state, while a second subsequently connected integrated circuit, e.g. part # DP83240, recovers the clock signal from the incoming signal, decodes or descrambles the NRZ, MLT3 or other cipher format encrypted signal and provides a plaintext data signal in a 4-bit parallel standard. The plaintext parallel data is then received by a buffer or processor provided by a variety of integrated circuits. For hub configurations, similar parallel data paths are provided.

As demonstrated by the widespread adherence to the parallel data format by integrated circuit and equipment designers, the limitations imposed on the data flow by the parallel format are generally accepted as unavoidable, and thus the performance of data translation equipment is only marginally improved.

SUMMARY OF THE INVENTION

The apparatus and method according to the present invention provide a serially buffered data translator including physical layer devices which provide the necessary media interfacing and clock recovery and a serial stream of encrypted data to a serial buffer, which provides frame synchronization with a minimal data bit delay, typically 5 bits. In one embodiment according to the present invention, the serial buffer comprises a National Semiconductor part no. DP83222 previously intended for serial descrambling prior to data conversion to parallel format and subsequent processing, but adapted according to the present invention to provide the serial bit output prior to retransmission in the alternate medium format.

Having recognized the desirability, and providing the apparatus and method to provide data translation according to the present invention, a total translated data delay time of 15 bits or less is achieved. When compared to the typical 4-bit serial-parallel-serial data systems data delay of at least 45 bits, the apparatus of the present invention provides a significant improvement.

BRIEF DESCRIPTION OF THE DRAWINGS

These and further features of the present invention will be better understood by reading the following Detailed Description together with the Drawing, wherein.

DETAILED DESCRIPTION OF THE INVENTION

Figure 1:
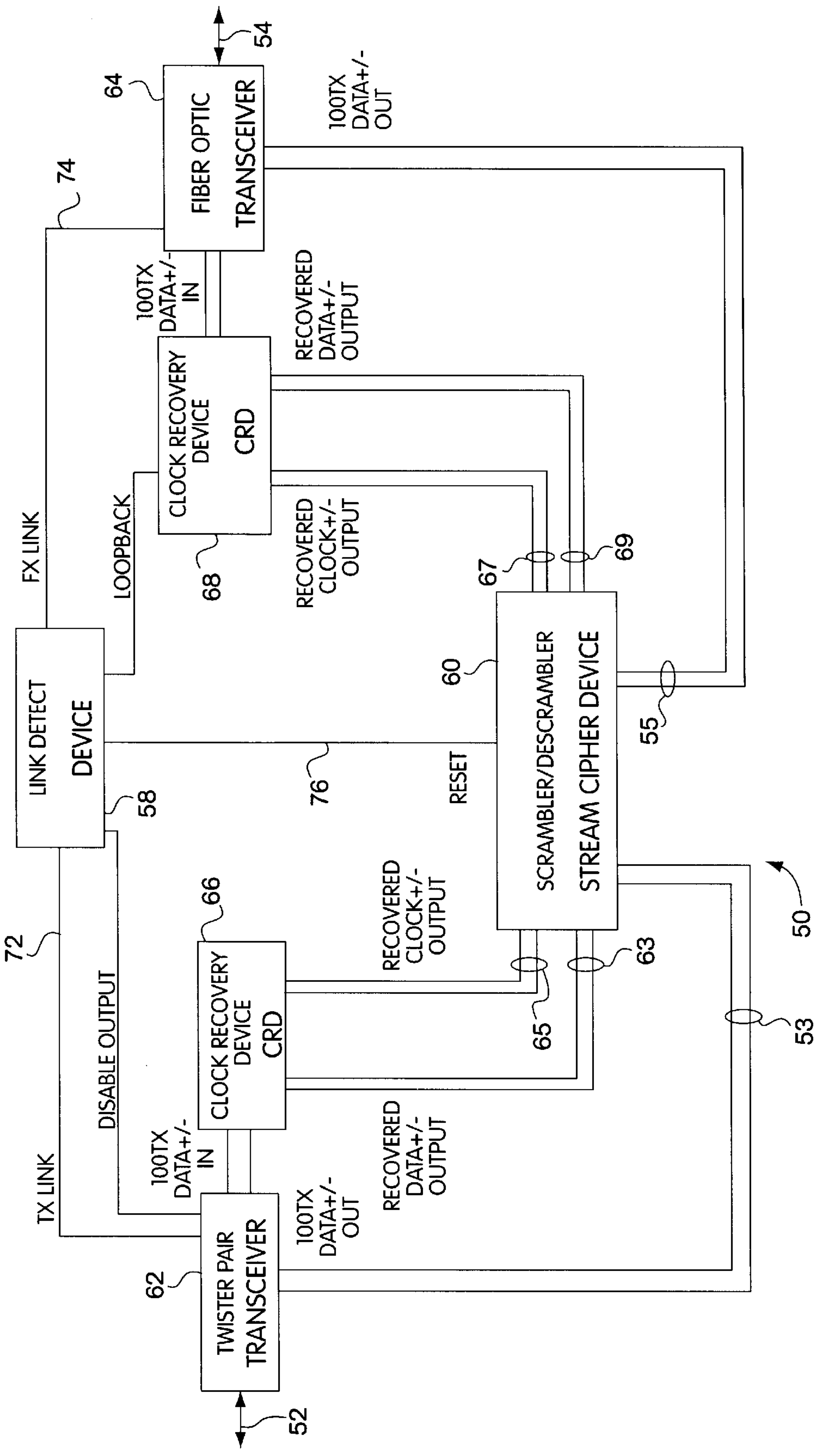
FIG. 1 is a block diagram of one embodiment of the present invention providing translation between a twisted pair and fiber optic medium.

The preferred embodiment 50 of the present invention as shown in FIG. 1, provides data translation from a first medium 52 via a transceiver 62, clock recovery device 66, stream cipher device 60 and second medium transceiver 64 to the second medium 54. In the present embodiment, the first exemplary medium is full or half duplex twisted pair compliant with ANSI X3T9.5 TP-PMD and IEEE 802.3 100BASE-TX Ethernet twisted pair specifications; other media are supportable according to the present invention. The second medium complies with the IEEE 802.3 100BASE-FX, FDDI fiber optic specifications; other media is supportable according to the present invention.

Data coming from the second medium to the first is translated according to the present invention via the second medium transceiver 64, second medium clock recovery device 68, stream cipher stream 60, and to the first medium 52 through the first medium transceiver 62.

The transceivers 62 and 64 typically comprise integrated circuit systems appropriate for each data medium. In the present embodiment, twisted pair medium transceivers 62 comprise on of parts no. DP 83223 of National Semiconductor, or equivalent, and fiber optic transceiver 64 comprises transceiver part no. HFBR-5103-SC by Hewlett-Packard, or equivalent, connected as known in the art to provide and receive serial electrical signals corresponding to the incoming or outgoing medium data. Typically, such circuit systems 62, 64 detect medium data signals present and provide a corresponding signal on paths 72, 74 to a link detect circuit 58. If the incoming medium signal fails or becomes unacceptably diminished in quality, the signal on the corresponding path changes. The link detect circuit then provides a 'lost synchronization' signal on path 76 to reset the stream cipher device 60 to reinitiate buffering and/or descrambling or scrambling according to the direction of the data interruption and as provided by the particular stream cipher device 60 structure implemented.

The stream cipher device 60 comprises a bidirectional descrambler/scrambler which receives, processes, and outputs data in entirely while in the 5-bit format. Although not limited thereto, the serial buffer of the present invention is economically implemented, in part, with a National Semiconductor part no. DP83222, and/or its equivalents.

Figure 1A:
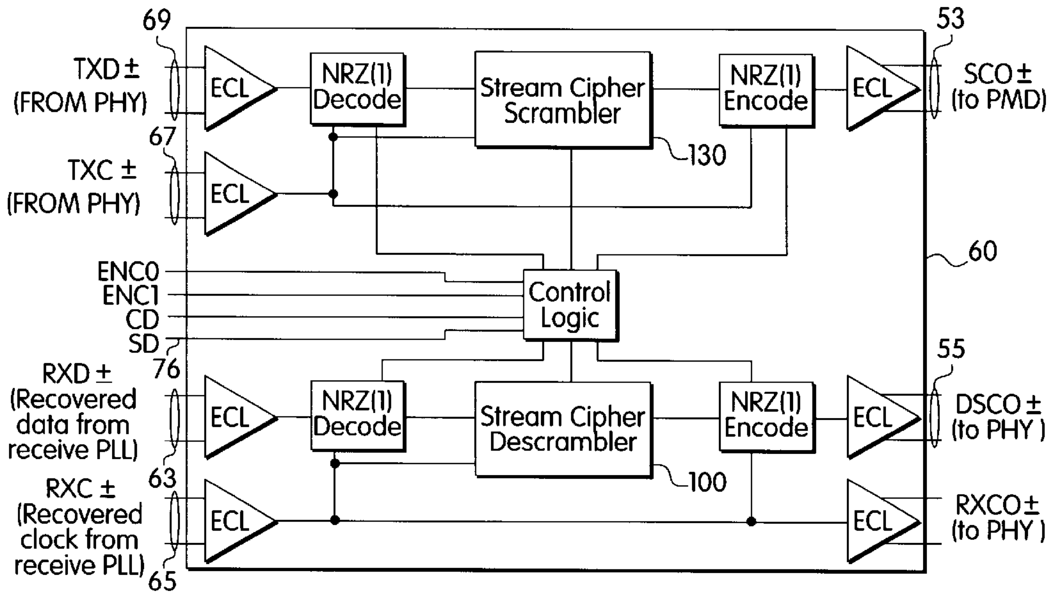
FIG. 1A is a block diagram of the scrambler/descrambler device according to the embodiment of FIG. 1.

The block diagram of the internal scrambler/descrambler device 60 according to one embodiment of the present invention is shown in FIG. 1A, wherein the stream cipher descrambler 100 provides the NRZ(I) decoded recovered data (received from signal path 63) to the fiber optic transceiver 64 via signal path 55 after being re-encoded (NRZ(I)) at a recovered clock rate provided over signal path 65. Similarly, the stream cipher scrambler 130 provides the NRZ(I) decoded data (received from the signal path 69) to the twisted pair transceiver 62 via signal path 53 as cipher scrambled data after being re-NRZ(I)-encoded.

The descrambler operates in either a sample mode or a hold mode according to the state of the MUX 120 as controlled by the signal provided by a register and line state monitor/hold timer 112 which detects a particular synchronizing data sequence. In the present embodiment, the IDLE line state, characterized by two sequences of 5 binary "1's" will allow data synchronization. However, the descrambler incoming data (at 102) is encrypted and received by tapped shift register 106 having an output via XOR gate 108 to be again combined with the original incoming stream via XOR 110 to provide an output, received by the register monitor/timer 112, which provides the original (unscrambled) IDLE data bit (2 groups of 5 "1" bits). When sufficient (>50, typically) idle "1" bits are received, the MUX 120 recirculates (via XOR 116), and provides an output, which when XOR combined with the incoming data by XOR gate 114, provides the descrambled data output at 122. When a loss of signal is indicated by a signal on 76, the descrambler re-enters sample mode. Other modes of synchronization are within the scope of the present invention as may be incorporated in integrated circuit for the particular medium data synchronization standard. The recovered twisted pair clock signal is received to provide the clock signals to the descrambler registers upon receipt of a particular initial frame signal. Further description of the operation of the particular descrambler (DP 83222) is provide by the 1994 National Semiconductor FDDI Data Book or equivalent, incorporated by reference. The descrambled data (plaintext) output 122 signal is re-NRZ(I) encoded and then received by the fiber optic medium transceiver 64 for transmission thereon at the rate of the data provided by the descrambled data output.

Figure 2A:
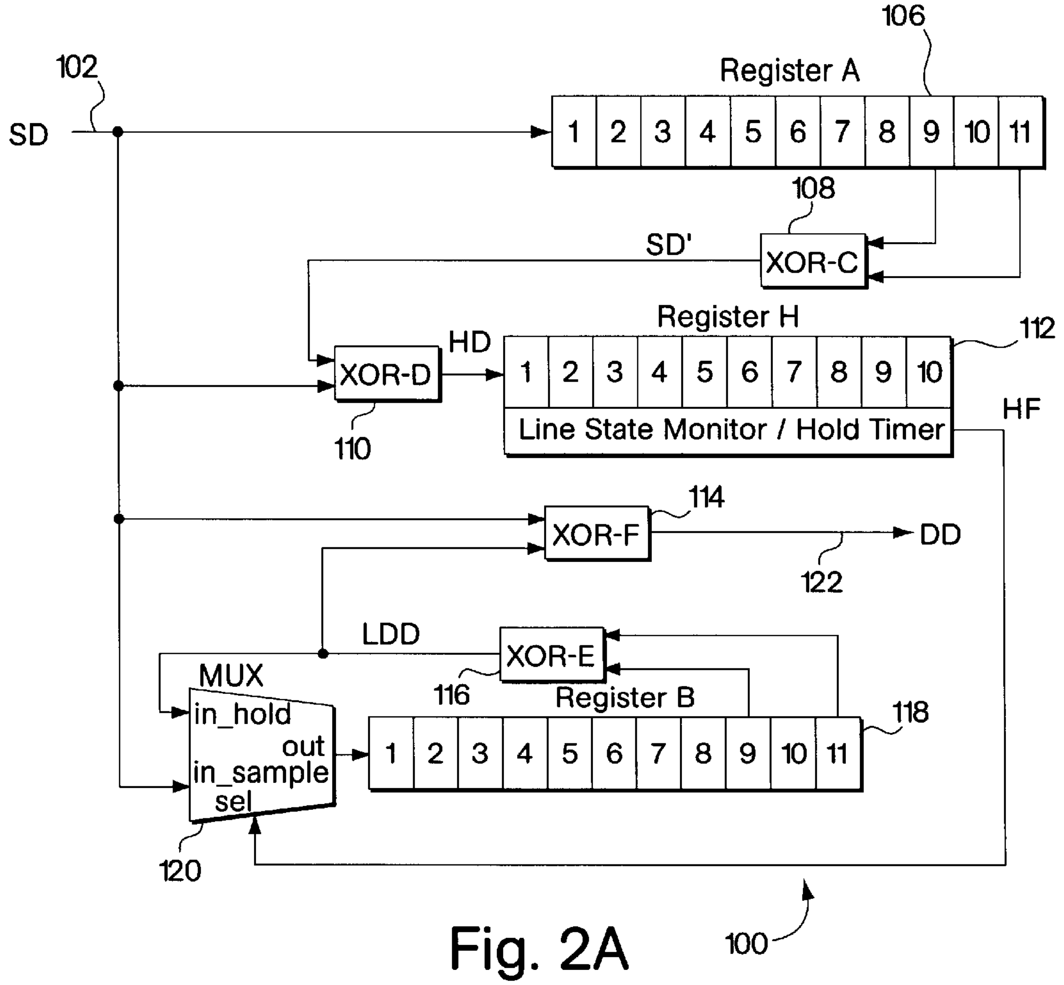
FIG. 2A and FIG. 2B are a block diagrams of the respective descrambler/scrambler structures as provided by an integrated circuit used in the embodiment of FIG. 1.
Figure 2B:
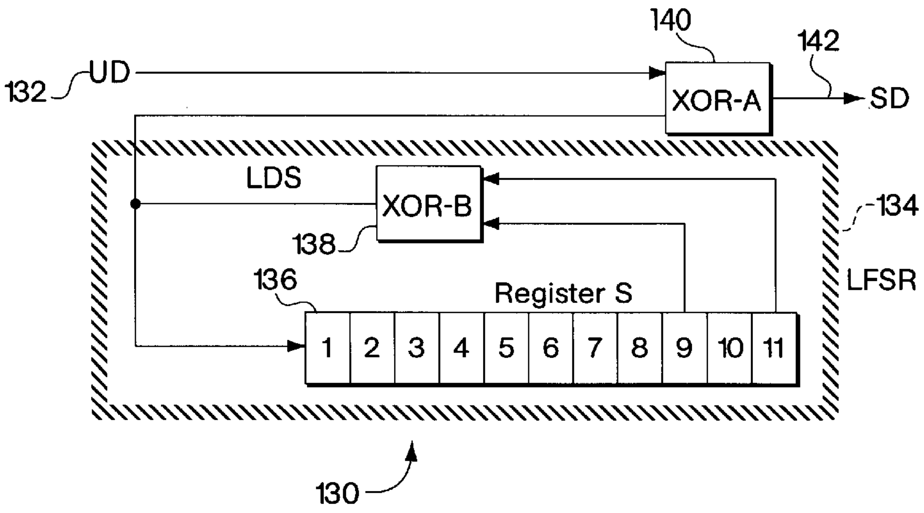

Similarly, the block diagram of the serial register 60 scrambler logic 130 is shown in FIG. 2B, wherein the fiber optic medium 54 data is received at the unscrambled data input 132 from the clock recovery device 68. The fiber optic medium recovered clock signal is received by a clock synchronization circuit 134 to provide the register clock and reset signals to the scrambler register(s) upon receipt of a frame synchronizing symbol on the received fiber optic medium data signal.

In the present embodiment, the fiber optic medium uses an NRZ (or NRZ-type) format which is presented to the input at 132 which is combined at the XOR gate 140 with a bit sequence generated by a linear feedback shift register 134 comprising a shift register 136 and XOR gate 138 connected to recirculate the XOR of bits 9 and 11. The scrambler data output 142 signal is received by the twisted pair transceiver 62 for transmission onto the twisted pair medium 52.

In the present embodiments, the descrambler 100 and scrambler 130 logic is contained within a single integrated circuit and may be independently and simultaneously operated to provide full duplex first-to-second and second-to-first media translation. Other embodiments may provide serial register 60 implementation with discrete logic and/or multiple descrambler/scrambler integrated circuits.

Alternate embodiments of the present invention provide a more direct data path from the medium (e.g. 52, 54) signals, such as directly from the medium receiver or transceiver (e.g. 62, 64).

Further modifications and substitutions made by one of ordinary skill in the art are considered within the scope of the present invention which is not to be limited except by the claims which follow.

What is claimed is:

1. Apparatus providing data translation between a first data medium and a second data medium, comprising:

a means for receiving serial data from said first data medium and providing a first medium signal;

a first medium clock recovery means connected to receive said first medium signal and providing a first medium clock signal and a recovered first medium data signal;

a serial data descrambler connected to receive said recovered first medium data signal from said first medium clock recovery means according to said first medium clock signal and providing a decoded first medium signal; and means for transmitting said decoded first medium signal received from said serial data descrambler to said second data medium.

2. The apparatus of claim 1, further including:

a means for receiving serial data from said second data medium and providing a second medium signal;

a second medium clock recovery means connected to receive said second medium signal and providing a second medium clock signal and a recovered second medium data signal;

a serial data scrambler connected to receive said recovered second medium data signal from said second medium clock recover means according to said second medium clock signal and providing an encoded second medium signal; and means for transmitting said encoded second medium signal received from said serial data scrambler to said first data medium.

3. The apparatus of claim 2, wherein said means for receiving serial data from said first data medium and said means for transmitting data to comprises a first medium data transceiver, and said means for receiving serial data from said second data medium and said means for transmitting data to said second data medium comprises a second medium data transceiver.

4. A bidirectional medium translator, comprising:

a first medium transceiver connected to a first medium for receiving and sending data thereon;

a first clock recovery device connected to said first medium transceiver for providing a recovered first medium clock signal and first medium data;

a second medium transceiver connected to a second medium for receiving and sending data thereon;

a data descrambler connected to receive said recovered first medium data and to provide a descrambled output to said second medium transceiver at said recovered first medium clock signal;

a second clock recovery device connected to said second medium transceiver for providing a recovered second medium clock signal and second medium data; and a data scrambler connected to receive said recovered second medium data and to provide a scrambled output to said first medium transceiver at said recovered second medium clock signal.

5. The bidirectional medium translator of claim 4, wherein at least one of said data scrambler and said descrambler includes means for decoding one of an NRZ and an NRZI signal and means for encoding one of an NRZ and an NRZI signal.

6. The apparatus of claim 1, wherein said serial data descrambler includes a serial data buffer which receives said recovered first medium data signal.

7. The apparatus of claim 2, wherein said serial data descrambler includes a serial data buffer which receives said recovered second medium data signal.

8. Apparatus providing data translation between a first data medium and a second data medium, comprising:

a means for receiving serial data from said first data medium and providing a first medium signal;

a first medium clock recovery means connected to receive said first medium signal and providing a first medium clock signal;

a serial data scrambler connected to receive a received first medium signal from said means for receiving serial data from a first data medium according to said first medium clock signal and providing a decoded first medium signal; and means for transmitting said decoded first medium signal from said serial data scrambler to said second data medium.

9. The apparatus of claim 8, wherein said serial data scrambler includes a serial data buffer which receives said received first medium signal.

* * * * *

UNITED STATES PATENT AND TRADEMARK OFFICE

CERTIFICATE OF CORRECTION

PATENT NO. : 6,320,872 B1

DATED : November 20, 2001

INVENTOR(S) : Asbjorn Sorhaug and Alekandr L. Kupchik

It is certified that error appears in the above-identified patent and that said Letters Patent is hereby corrected as shown below:

Title page,

Item [12], delete "Asbjorn", insert -- Sorhaug --

Item [75], Inventors, delete "Sorhaug Asbjorn", insert -- Asbjorn Sorhaug --

Signed and Sealed this

Fourth Day of January, 2005

JON W. DUDAS

*Director of the United States Patent and Trademark Office*